United States Patent
Hu et al.

(10) Patent No.: US 12,545,242 B2
(45) Date of Patent: Feb. 10, 2026

(54) IDENTIFICATION OF EDGE POINTS AND PLANAR POINTS IN POINT CLOUD OBTAINED BY VEHICLE LIDAR SYSTEM

(71) Applicant: GM Global Technology Operations LLC, Detroit, MI (US)

(72) Inventors: Yao Hu, Sterling Heights, MI (US); Xinyu Du, Oakland Township, MI (US); Wende Zhang, Birmingham, MI (US); Hao Yu, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1127 days.

(21) Appl. No.: 17/518,169

(22) Filed: Nov. 3, 2021

(65) Prior Publication Data

US 2023/0137464 A1  May 4, 2023

(51) Int. Cl.
  *B60W 30/08*  (2012.01)
  *G06F 18/213*  (2023.01)

(52) U.S. Cl.
  CPC .......... *B60W 30/08* (2013.01); *G06F 18/213* (2023.01); *B60W 2420/408* (2024.01)

(58) Field of Classification Search
  CPC ............. B60W 30/08; B60W 2420/408; G06F 18/213; G01S 7/4817; G01S 17/931; G06V 20/58; G06V 10/44; G06V 20/56
  See application file for complete search history.

(56) References Cited

U.S. PATENT DOCUMENTS

| | | | |
|---|---|---|---|
| 2010/0121577 A1* | 5/2010 | Zhang | .................. G06V 20/588 382/104 |
| 2019/0346271 A1* | 11/2019 | Zhang | .................... G05D 1/245 |
| 2023/0341526 A1* | 10/2023 | Pulikkaseril | ......... G02B 27/126 |

FOREIGN PATENT DOCUMENTS

CN  108320329 A  7/2018

OTHER PUBLICATIONS

Y. Zhai, Q. Liu, H. Li, D. Chen and Z. He, "Non-mechanical beam-steer lidar system based on swept-laser source," 2018 Conference on Lasers and Electro-Optics (CLEO), San Jose, CA, USA, 2018, pp. 1-2. (Year: 2018).*

* cited by examiner

*Primary Examiner* — Ig T An
(74) *Attorney, Agent, or Firm* — CANTOR COLBURN LLP

(57) ABSTRACT

A system in a vehicle includes a lidar system to transmit incident light and receive reflections from one or more objects as a point cloud of points. The system also includes processing circuitry to identify feature points among the points of the point cloud using principal component analysis. The feature points are planar points that form one or more surfaces or edge points. A set of edge points forms a linear surface.

10 Claims, 4 Drawing Sheets

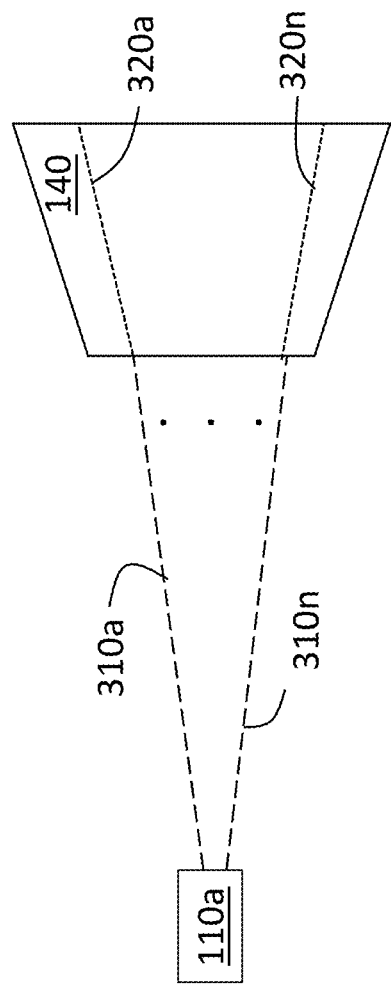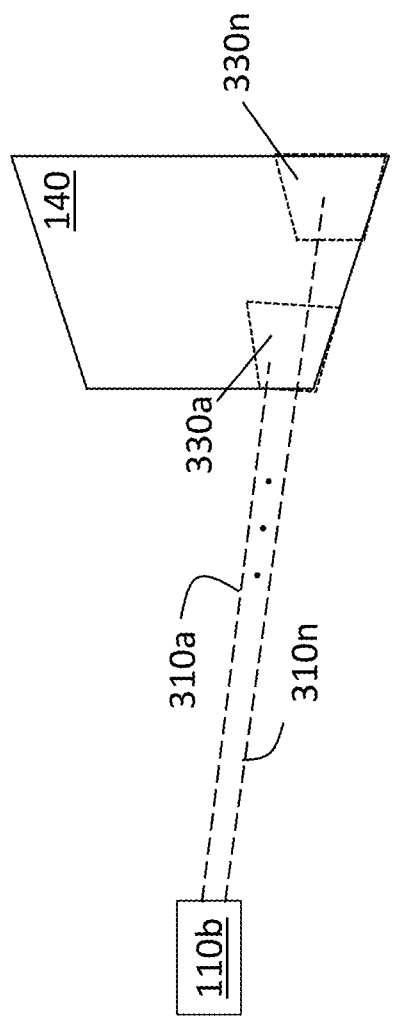

IDENTIFICATION OF EDGE POINTS AND PLANAR POINTS IN POINT CLOUD OBTAINED BY VEHICLE LIDAR SYSTEM

The subject disclosure relates to the identification of edge points and planar points in a point cloud obtained by a vehicle lidar system.

Vehicles (e.g., automobiles, trucks, construction equipment, farm equipment) increasingly include sensors that obtain information about the vehicle and its environment. The information facilitates semi-autonomous or autonomous operation of the vehicle. For example, sensors (e.g., camera, radar system, lidar system, inertial measurement unit (IMU), steering angle sensor) may facilitate semi-autonomous maneuvers such as automatic braking, collision avoidance, or adaptive cruise control. A lidar system obtains a point cloud that must be processed to obtain information that would facilitate control of vehicle operation. Accordingly, it is desirable to provide the identification of edge points and planar points in the point cloud obtained by a vehicle lidar system.

SUMMARY

In one exemplary embodiment, a system in a vehicle includes a lidar system to transmit incident light and receive reflections from one or more objects as a point cloud of points. The system also includes processing circuitry to identify feature points among the points of the point cloud using principal component analysis, the feature points being planar points that form one or more surfaces or edge points. A set of edge points forms a linear surface.

In addition to one or more of the features described herein, the lidar system is a beam-based lidar system that transmits each beam of incident light across a horizontal scan line.

In addition to one or more of the features described herein, the lidar system is a non-beam-based lidar system that transmits each beam of incident light over an area.

In addition to one or more of the features described herein, the processing circuitry identifies neighbor points of each point in the point cloud. The neighbor points are all points of the point cloud that are within a threshold distance of the point.

In addition to one or more of the features described herein, the processing circuitry uses principal component analysis by calculating eigenvalues $[\lambda_{i0}, \lambda_{i1}, \lambda_{i2}]$ of a covariance matrix of the neighbor points of each point, where $\lambda_{i0} > \lambda_{i1} > \lambda_{i2}$.

In addition to one or more of the features described herein, eigenvectors corresponding to the eigenvalues $\lambda_{i0}$, $\lambda_{i1}$, and $\lambda_{i2}$ are not limited to a particular orientation.

In addition to one or more of the features described herein, the processing circuitry identifies the point as an edge point, a planar point, or neither the edge point or the planar point alone based on comparing the eigenvalues to threshold values.

In addition to one or more of the features described herein, the processing circuitry identifies the point as the edge point based on the eigenvalue $\lambda_{i0}$ exceeding a first threshold while the eigenvalues $\lambda_{i1}$ and $\lambda_{i2}$ are less than a second threshold.

In addition to one or more of the features described herein, the processing circuitry identifies the point as the planar point based on the eigenvalues $\lambda_{i0}$ and $\lambda_{i1}$ exceeding a third threshold while the eigenvalue $\lambda_{i2}$ is less than a fourth threshold.

In addition to one or more of the features described herein, the processing circuitry identifies an object based on the feature points.

In another exemplary embodiment, a method in a vehicle includes obtaining, at processing circuitry from a lidar system configured to transmit incident light and receive reflections from one or more objects, a point cloud of points. The method also includes identifying, by the processing circuitry, feature points among the points of the point cloud using principal component analysis, the feature points being planar points that form one or more surfaces or edge points. A set of edge points forms a linear surface.

In addition to one or more of the features described herein, the obtaining the point cloud is from a beam-based lidar system that transmits each beam of incident light across a horizontal scan line.

In addition to one or more of the features described herein, the obtaining the point cloud is from a non-beam-based lidar system that transmits each beam of incident light over an area.

In addition to one or more of the features described herein, the method also includes the processing circuitry identifying neighbor points of each point in the point cloud, wherein the neighbor points are all points of the point cloud that are within a threshold distance of the point.

In addition to one or more of the features described herein, the method also includes the processing circuitry using principal component analysis by calculating eigenvalues $[\lambda_{i0}, \lambda_{i1}, \lambda_{i2}]$ of a covariance matrix of the neighbor points of each point, where $\lambda_{i0} > \lambda_{i1} > \lambda_{i2}$.

In addition to one or more of the features described herein, eigenvectors corresponding to the eigenvalues $\lambda_{i0}$, $\lambda_{i1}$, and $\lambda_{i2}$ are not limited to a particular orientation.

In addition to one or more of the features described herein, the method also includes the processing circuitry comparing the eigenvalues to threshold values to identify the point as an edge point, a planar point, or neither the edge point or the planar point alone.

In addition to one or more of the features described herein, the method also includes the processing circuitry identifying the point as the edge point based on the eigenvalue $\lambda_{i0}$ exceeding a first threshold while the eigenvalues $\lambda_{i1}$ and $\lambda_{i2}$ are less than a second threshold.

In addition to one or more of the features described herein, the method also includes the processing circuitry identifying the point as the planar point based on the eigenvalues $\lambda_{i0}$ and $\lambda_{i1}$ exceeding a third threshold while the eigenvalue $\lambda_{i2}$ is less than a fourth threshold.

In addition to one or more of the features described herein, the method also includes the processing circuitry identifying an object based on the feature points.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 3A illustrates an exemplary beam-based lidar system that generates a point cloud within which edge points and planar points are identified according to one or more embodiments;

FIG. 3B illustrates an exemplary non-beam-based lidar system that generates a point cloud within which edge points and planar points are identified according to one or more embodiments;

DETAILED DESCRIPTION

Figure 1:
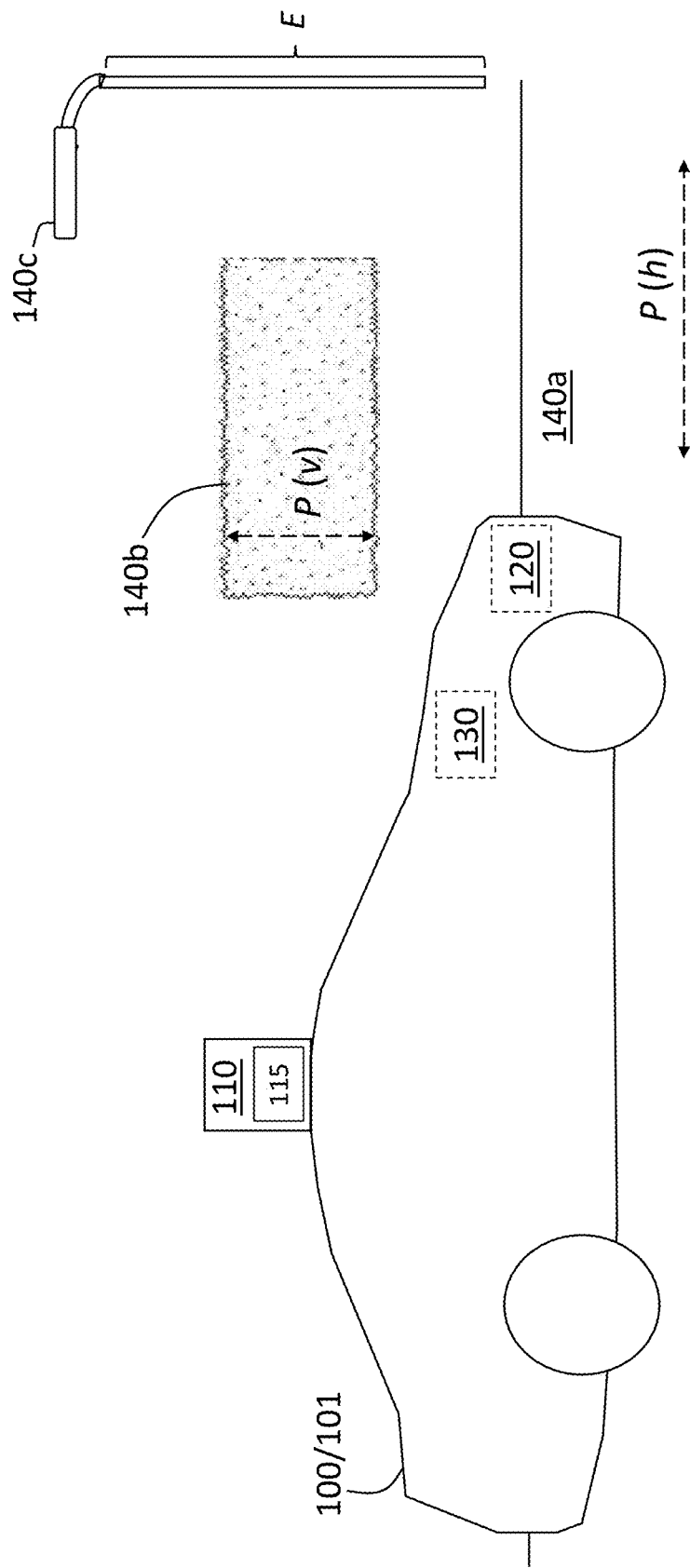
FIG. 1 is a block diagram of a vehicle implementing identification of edge points and planar points in a point cloud obtained with a lidar system according to one or more embodiments.

The following description is merely exemplary in nature and is not intended to limit the present disclosure, its application or uses. It should be understood that throughout the drawings, corresponding reference numerals indicate like or corresponding parts and features.

As previously noted, a point cloud obtained with a lidar system must be processed in order to obtain information about detected objects. The process is referred to as feature extraction. More specifically, feature extraction refers to the identification of features such as edges and planes within the point cloud. The identification of these edges and planes facilitates the identification of objects in the scene. A beam-based point cloud refers to one that is made up of multiple horizontal scan lines corresponding to multiple beams of the light source (e.g., laser) that are transmitted to obtain the point cloud as reflections. That is, each scan line corresponds to a transmitted beam. The vertical resolution of a beam-based point cloud is limited by how close the transmitted beams and, consequently, how close the scan lines are to each other. Thus, another type of point cloud that may be obtained is a non-beam-based point cloud. A non-beam-based point cloud may refer, for example, to a point cloud formed as a patch (e.g., cube) per beam. Such a point cloud does not include the horizontal scan lines that define a beam-based point cloud.

Prior feature extraction techniques (e.g., laser odometry and mapping (LOAM)) are well-suited to beam-based point clouds but rely on the horizontal scan lines and, thus, are unsuited for non-beam-based point clouds. Embodiments of the systems and methods detailed herein relate to the identification of edge points and planar points in a point cloud obtained with a vehicle lidar system. Generally, a set of edge points may indicate a linear surface (e.g., long and narrow) (e.g., of a tree, lamp post) while a set of planar points may indicate a surface area (e.g., of a road, broadside of a car). A grouping or set of neighbor points is identified. Principal component analysis (PCA) (i.e., an eigen-decomposition of the covariance matrix of the neighbor points) is used to identify edge points and planar points, as detailed.

In accordance with an exemplary embodiment, FIG. 1 is a block diagram of a vehicle 100 that implements identification of edge points E and planar points P in a lidar point cloud 205 (FIG. 2) obtained with a lidar system 110. The exemplary vehicle 100 shown in FIG. 1 is an automobile 101. The lidar system 110 may be beam-based or non-beam-based, as illustrated in FIGS. 3A and 3B. The lidar system 110 includes a lidar controller 115. The vehicle 100 includes additional sensors 120 (e.g., radar system, camera, IMU) and a controller 130. The controller 130 may obtain information from the lidar system 110 and other sensors 120 and may control semi-autonomous or autonomous operation of the vehicle 100. The numbers and locations of the lidar system 110 and other sensors 120 are not intended to be limited by the exemplary illustration in FIG. 1.

The feature extraction processes (i.e., processes to identify edge points E and planar points P among the point cloud 205) discussed for the lidar system 110 may be performed by the lidar controller 115, controller 130, or a combination of the two. The lidar controller 115 and controller 130 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 2:
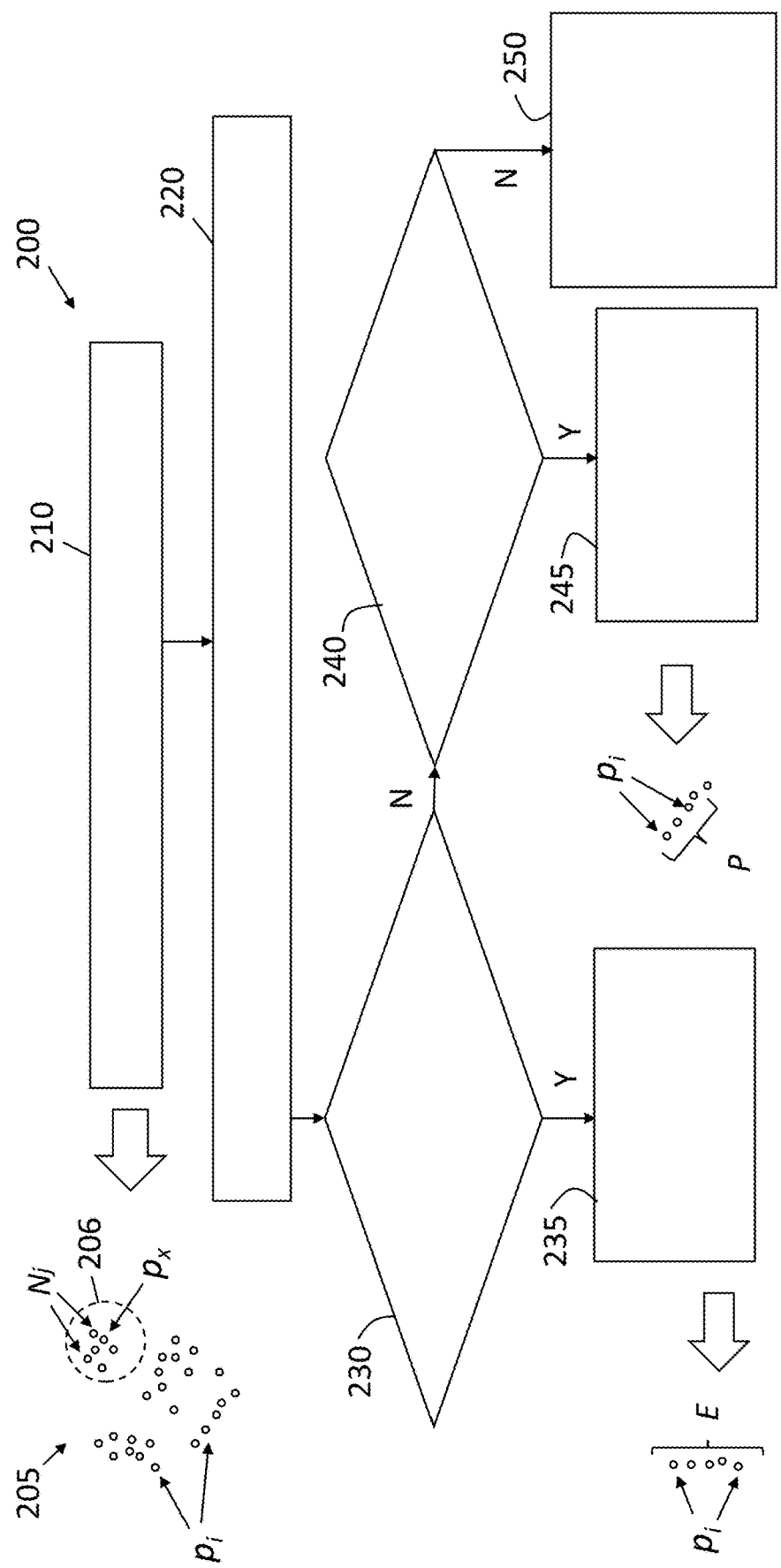
FIG. 2 is a process flow of a method of identifying edge points and planar points in a point cloud obtained with a lidar system of a vehicle according to one or more embodiments.

The lidar system 110 transmits incident light and receives reflected light. The reflected light is a result of reflection of the incident light by different parts of the objects 140 in the field of view of the lidar system 110. The reflected light is in the form of points $p_i$ that form a point cloud 205 (FIG. 2). In order to identify and locate objects 140 within the point cloud 205, the point cloud 205 must be processed. Specifically, feature extraction may be performed, as discussed with reference to FIG. 2. In FIG. 1, three exemplary objects 140a, 140b, 140c (generally referred to as 140) in the field of view of the lidar system 110 are shown. The object 140a is a road surface and the object 140b is a hedge row. Both of these objects 140 may reflect incident light from the lidar system 110 to generate planar points P in a point cloud 205, as indicated. The object 140c is a light pole and may reflect incident light from the lidar system 110 to generate a set of edge points E in the point cloud 205, as indicated.

As noted, the feature extraction results in the identification of points $p_i$ that are edge points E or planar points P. The points $p_i$ that are planar points P may be part of a horizontal plane h or a vertical plane v. An exemplary horizontal plane h from which points $p_i$ in the point cloud 205 may be obtained is illustrated by the road surface (object 140a). Similarly, an exemplary vertical plane v from which points $p_i$ in the point cloud 205 may be obtained is illustrated by the hedge row 140b. As shown in FIG. 2, planar points P need not be limited to only the vertical plane v or the horizontal plane h. When the point cloud 205 is obtained, performing feature extraction may help to identify the object 140 that reflects incident light at the points $p_i$ in the point cloud 205.

FIG. 2 is a process flow of a method 200 of identifying edge points E and planar points P in a point cloud 205 obtained with a lidar system 110 of a vehicle 100 according to one or more embodiments. At block 210, the processes include selecting a set of neighbor points $N_j$ for each point $p_i$ of the point cloud 205, as indicated. The neighbor points $N_j$ may be identified as those within a threshold distance of the point p for example. An exemplary point $p_x$ is shown at the center of a circle 206 that represents the threshold distance such that the subset of all the points $p_i$ of the point cloud 205 that are within that circle 206 are neighbor points $N_j$ of the exemplary point $p_x$.

At block 220, the processes include performing principal component analysis (PCA). Specifically, the processes include calculating eigenvalues $[\lambda_{i0}, \lambda_{i1}, \lambda_{i2}]$ of a covariance matrix of neighbor points $N_j$. In PCA, eigenvalues $[\lambda_{i0}, \lambda_{i1}, \lambda_{i2}]$ represent the variance in magnitude in the direction of the largest spread of the neighbor points N. The eigenvalues

[$\lambda_{i0}, \lambda_{i1}, \lambda_{i2}$] are in order of decreasing magnitude (i.e., $\lambda_{i0} > \lambda_{i1} > \lambda_{i2}$) and may pertain to any orientation. That is, for example, based on the specific set of neighbor points $N_j$, the eigenvalue $\lambda_{i0}$ (i.e., the one with the highest magnitude) may pertain to the x, y, or z axis, whichever represents the direction of largest spread. This is further discussed with reference to FIGS. 4A, 4B, and 4C. At block 230, a check is done of whether all of the following are true: $\lambda_{i0}$ (the highest eigenvalue)>threshold1 and both $\lambda_{i1}$ and $\lambda_{i2}$<threshold2. If the check at block 230 indicates that the conditions are met, then the point $p_i$ is identified as an edge point E at block 235. An exemplary set of edge points E is shown. If the check at block 230 indicates that at least one of the conditions is not met, then the check at block 240 is completed.

At block 240, a check is done of whether all of the following are true: $\lambda_{i0}$ and $\lambda_{i1}$ (the highest and second highest eigenvalues)>threshold3 and $\lambda_{i2}$ (the lowest eigenvalue)<threshold4. If the check at block 240 indicates that all the conditions are met, then the point $p_i$ is identified as a planar point P at block 245. An exemplary set of edge points P is shown. If the check at block 240 indicates that not only the conditions checked at block 230 but also the conditions checked at block 240 are not met, then the point $p_i$ is designated, at block 250, as neither an edge point E nor a planar point P alone. The point $p_i$ may be both an edge point E and a planar point P or neither. The point $p_i$ may be an edge between two planes formed in different directions, as another example of a point $p_i$ that may be designated at block 250. As previously noted, identifying the planar points P and the edge points E may facilitate identifying the object 140 that reflected light from the lidar system 110 to provide the point cloud 205.

FIG. 3A illustrates an exemplary beam-based lidar system 110a and FIG. 3B illustrates an exemplary non-beam-based lidar system 110b. Each of the lidar systems 110a, 110b is shown with an object 140 (e.g., wall) in its field of view. As shown in FIG. 3A, each beam 310a through 310n (generally referred to as 310) results in a horizontal scan line 320a through 320n (generally referred to as 320). Thus, the point cloud 400 formed from reflections of the scan lines 320 would also be in the form of lines with separation in the vertical dimension that corresponds with a separation between adjacent beams 310. As previously noted, this limits the vertical resolution of the beam-based lidar system 110a according to how closely the beams 310 are spaced.

As shown in FIG. 3B, each beam 310 results in an area 330a through 330n (generally referred to as 330) or a patch that is scanned by the beam. Thus, in the non-beam-based lidar system 110b, a horizontal scan is not accomplished by each beam 310 individually, as it is in the beam-based lidar system 110a. As previously noted, prior feature extraction techniques rely on the horizontal scan lines 320 of a beam-based lidar system 110a. According to one or more embodiments, the processes discussed with reference to FIG. 3 are applicable to both beam-based and non-beam based lidar systems 110.

Figure 4C:
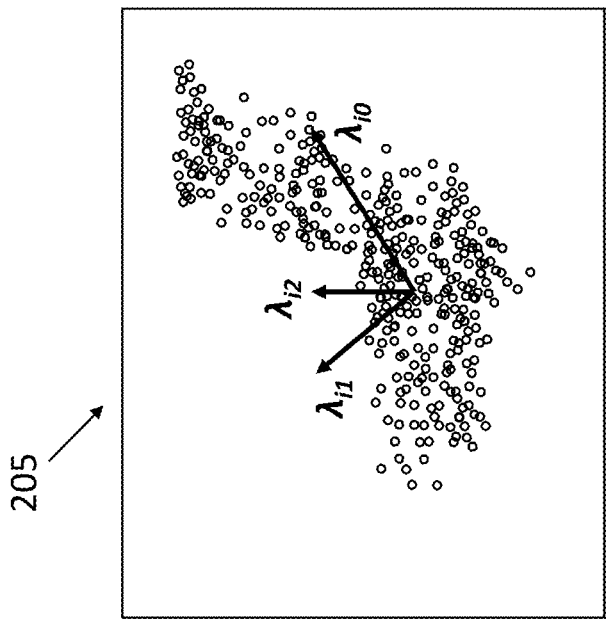
FIG. 4C illustrates eigenvectors corresponding to a point that is neither an edge point nor a planar point.
Figure 4B:
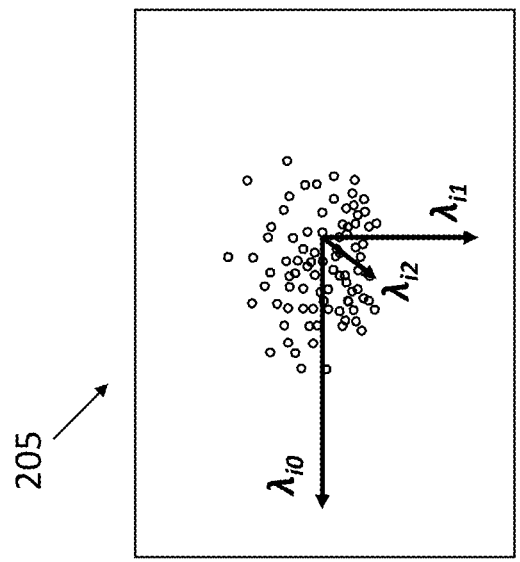
FIG. 4B illustrates eigenvectors corresponding to a planar point.
Figure 4A:
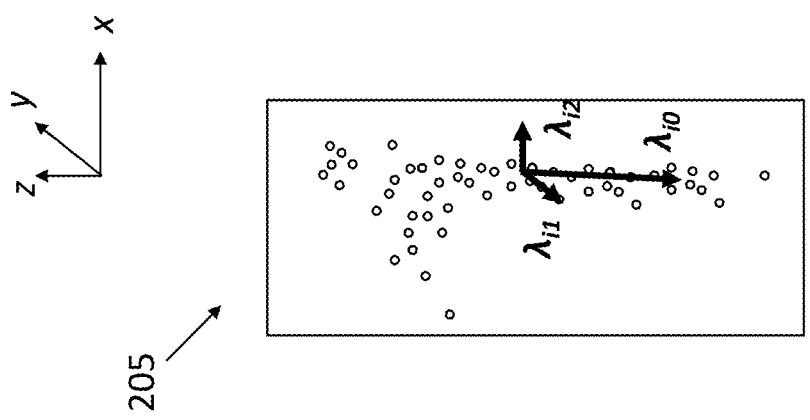
FIG. 4A illustrates eigenvectors corresponding to an edge point.

FIGS. 4A, 4B, and 4C illustrate eigenvectors resulting from the PCA performed at block 220. FIG. 4A illustrates eigenvectors corresponding with eigenvalues [$\lambda_{i0}, \lambda_{i1}, \lambda_{i2}$] obtained from neighbor points $N_j$ for an exemplary point $p_i$ that is an edge point E. As shown, and consistent with the check at block 230, the eigenvector corresponding with the highest eigenvalue $\lambda_{i0}$ is longer than the eigenvectors corresponding with the other two eigenvalues $\lambda_{i1}$ and $\lambda_{i2}$. As previously noted, the eigenvalues [$\lambda_{i0}, \lambda_{i1}, \lambda_{i2}$] are arranged in order of magnitude. In the exemplary case shown in FIG. 4A, the highest eigenvalue $\lambda_{i0}$ corresponds with the z axis according to the exemplary coordinate system shown.

FIG. 4B illustrates eigenvectors corresponding with eigenvalues [$\lambda_{i0}, \lambda_{i1}, \lambda_{i2}$] obtained from neighbor points $N_j$ for an exemplary point $p_i$ that is a planar point P. As shown, and consistent with the check at block 240, the eigenvectors corresponding with the highest two eigenvalues $\lambda_{i0}$ and $\lambda_{i1}$ are longer than the eigenvector corresponding with the smallest eigenvalue $\lambda_{i2}$. In the exemplary case shown in FIG. 4B, the highest eigenvalue $\lambda_{i0}$ corresponds with the x axis according to the exemplary coordinate system shown.

FIG. 4C illustrates eigenvectors corresponding with eigenvalues [$\lambda_{i0}, \lambda_{i1}, \lambda_{i2}$] obtained from neighbor points $N_j$ for an exemplary point $p_i$ that is neither an edge point E nor a planar point P alone. As shown, and consistent with failing the checks at blocks 230 and 240, the eigenvectors corresponding with all of the eigenvalues [$\lambda_{i0}, \lambda_{i1}, \lambda_{i2}$] are large (e.g., all the eigenvalues [$\lambda_{i0}, \lambda_{i1}, \lambda_{i2}$] exceed threshold2 and threshold4, as checked at blocks 230 and 240). The exemplary point $p_i$ may be both an edge point E and a planar point P or neither.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A system in a vehicle comprising:
a lidar system configured to transmit incident light and receive reflections from one or more objects as a point cloud of points;
processing circuitry configured to identify feature points among the points of the point cloud using principal component analysis, the feature points being planar points that form one or more surfaces or edge points, wherein a set of edge points forms a linear surface, and to identify neighbor points of each point in the point cloud, wherein the neighbor points are all points of the point cloud that are within a threshold distance of the point; and
a controller to control semi-autonomous or autonomous operation of the vehicle to maneuver the vehicle based at least in part on the feature points,
wherein the processing circuitry is configured to use principal component analysis by calculating eigenvalues [$\lambda_{i0}, \lambda_{i1}, \lambda_{i2}$] of a covariance matrix of the neighbor points of each point, where $\lambda_{i0} > \lambda_{i1} > \lambda_{i2}$,
wherein the processing circuitry is configured to identify the point as an edge point, a planar point, or neither the edge point or the planar point alone based on comparing the eigenvalues to threshold values,
wherein the processing circuitry is configured to identify the point as the edge point based on the eigenvalue $\lambda_{i0}$ exceeding a first threshold while the eigenvalues $\lambda_{i1}$, and $\lambda_{i2}$ are less than a second threshold, and
wherein the processing circuitry is configured to identify the point as the planar point based on the eigenvalues $\lambda_{i0}$ and $\lambda_{i1}$ exceeding a third threshold while the eigenvalue $\lambda_{i2}$ is less than a fourth threshold.

2. The system according to claim 1, wherein the lidar system is a beam-based lidar system that transmits each beam of incident light across a horizontal scan line.

3. The system according to claim 1, wherein the lidar system is a non-beam-based lidar system that transmits each beam of incident light over an area.

4. The system according to claim 1, wherein eigenvectors corresponding to the eigenvalues $\lambda_{i0}$, $\lambda_{i1}$, and $\lambda_{i2}$ are not limited to a particular orientation.

5. The system according to claim 1, wherein the processing circuitry is configured to identify an object based on the feature points.

6. A method in a vehicle, the method comprising:
obtaining, at processing circuitry from a lidar system configured to transmit incident light and receive reflections from one or more objects, a point cloud of points;
identifying, by the processing circuitry, feature points among the points of the point cloud using principal component analysis, the feature points being planar points that form one or more surfaces or edge points, wherein a set of edge points forms a linear surface, and to identify neighbor points of each point in the point cloud;
using principal component analysis by calculating eigenvalues [$\lambda_{i0}$, $\lambda_{i1}$, $\lambda_{i2}$] of a covariance matrix of the neighbor points of each point, where $\lambda_{i0} > \lambda_{i1} > \lambda_{i2}$;
comparing the eigenvalues to threshold values to identify the point as an edge point, a planar point, or neither the edge point or the planar point alone,
identifying the point as the edge point based on the eigenvalue $\lambda_{i0}$ exceeding a first threshold while the eigenvalues $\lambda_{i1}$, and $\lambda_{i2}$ are less than a second threshold, and
identifying the point as the planar point based on the eigenvalues $\lambda_{i0}$ and $\lambda_{i1}$ exceeding a third threshold while the eigenvalue $\lambda_{i2}$ is less than a fourth threshold; and
controlling, by a controller, semi-autonomous or autonomous operation of the vehicle to maneuver the vehicle based at least in part on the feature points.

7. The method according to claim 6, wherein the obtaining the point cloud is from a beam-based lidar system that transmits each beam of incident light across a horizontal scan line.

8. The method according to claim 6, wherein the obtaining the point cloud is from a non-beam-based lidar system that transmits each beam of incident light over an area.

9. The method according to claim 6, wherein eigenvectors corresponding to the eigenvalues $\lambda_{i0}$, $\lambda_{i1}$, and $\lambda_{i2}$ are not limited to a particular orientation.

10. The method according to claim 6, further comprising the processing circuitry identifying an object based on the feature points.

* * * * *